United States Patent
Roskind et al.

(10) Patent No.: US 9,357,002 B1
(45) Date of Patent: May 31, 2016

(54) MITIGATION OF OPTIMISTIC ACKNOWLEDGEMENT ATTACKS IN A COMPUTER PROTOCOL

(71) Applicant: Google Inc., Mountain View, CA (US)

(72) Inventors: James Anthony Roskind, Redwood City, CA (US); Ryan Cameron Hamilton, San Jose, CA (US)

(73) Assignee: Google Inc., Mountain View, CA (US)

( * ) Notice: Subject to any disclaimer, the term of this patent is extended or adjusted under 35 U.S.C. 154(b) by 441 days.

(21) Appl. No.: 13/858,873

(22) Filed: Apr. 8, 2013

(51) Int. Cl.
  *G06F 15/16* (2006.01)
  *H04L 29/08* (2006.01)

(52) U.S. Cl.
  CPC .................................... *H04L 67/104* (2013.01)

(58) Field of Classification Search
  None
  See application file for complete search history.

(56) References Cited

U.S. PATENT DOCUMENTS

| | | | |
|---|---|---|---|
| 8,176,545 B1 * | 5/2012 | Greenfield et al. | 726/14 |
| 2003/0229786 A1 * | 12/2003 | Hollis et al. | 713/168 |
| 2005/0021827 A1 * | 1/2005 | Matsuura | 709/232 |
| 2008/0133929 A1 * | 6/2008 | Gehrmann et al. | 713/179 |
| 2011/0078237 A1 * | 3/2011 | Nakamura | 709/203 |

* cited by examiner

*Primary Examiner* — Brian P Whipple (74) *Attorney, Agent, or Firm* — McDermott Will & Emery LLP (57) ABSTRACT

A method for verifying receipt of data packets, including generating a plurality of data packets, wherein each of the plurality of data packets comprises entropy information, transmitting one or more of the plurality of data packets to a receiver, receiving a first hash from the receiver, wherein the first hash is based on the entropy information of the one or more of the plurality of data packets and validating the first hash to determine if the receiver received the one or more of the plurality of data packets. Systems and computer-readable media are also provided.

20 Claims, 4 Drawing Sheets

MITIGATION OF OPTIMISTIC ACKNOWLEDGEMENT ATTACKS IN A COMPUTER PROTOCOL

BACKGROUND

The subject application relates to systems and methods for verifying receipt of data packets by a receiver, and safeguarding against false reporting by the receiver, that data packets have been received.

SUMMARY

The disclosed subject matter relates to a computer-implemented method for verifying receipt of data packets, comprising generating a plurality of data packets, wherein each of the plurality of data packets comprises entropy information, transmitting one or more of the plurality of data packets to a receiver and receiving a first hash from the receiver, wherein the first hash is based on the entropy information of the one or more of the plurality of data packets. In certain aspects, the method can further include steps for validating the first hash to determine if the receiver received the one or more of the plurality of data packets.

In other aspects, the subject technology relates to a system for verifying receipt of data packets, the system including one or more processors and a computer-readable medium comprising instructions stored therein, which when executed by the processors, cause the processors to perform operations including generating a plurality of data packets, wherein each of the plurality of data packets comprises entropy information, transmitting one or more of the plurality of data packets to a receiver and receiving a first hash from the receiver, wherein the first hash is based on a commutative calculation performed using at least a part of the entropy information of the one or more of the plurality of data packets. In certain aspects, the processors can be further configured to perform operations for validating the first hash to determine if the receiver received the one or more of the plurality of data packets.

The disclosed subject matter also relates to computer-readable storage medium including instructions stored therein, which when executed by a processor, cause the processor to perform operations including generating a plurality of data packets, wherein each of the plurality of data packets comprises entropy information, transmitting one or more of the plurality of data packets to a receiver and receiving a first hash from the receiver, wherein the first hash is based on the entropy information of the one or more of the plurality of data packets. In certain aspects, the operations may further include validating the first hash to determine if the receiver received the one or more of the plurality of data packets.

It is understood that other configurations of the subject technology will become readily apparent to those skilled in the art from the following detailed description, wherein various configurations of the subject technology are shown and described by way of illustration. The subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Some communication protocols, such as TCP, support congestion avoidance mechanisms wherein a recipient's acknowledgement of received packets can cause a sender to emit data at increasingly higher rates. However, falsely reported acknowledgements can be problematic for high bandwidth transmitting services because the increasing volume of generated traffic can overwhelm intermediary buffers, effectively resulting in a denial of service attack. Aspects of the subject technology provide a way for a data transmitter (e.g., a sender) to verify the receipt of packets by a receiver. As used herein "sender" and "receiver" can refer to any processor based devices that are configured to send/receive data packets over a communication network, such as the Internet.

As discussed in further detail below, the subject technology provides a process by which probabilistic proof of packet receipt can be verified by a sender. For example, the subject technology provides a transmission and verification process by which "entropy information" is included in packets transmitted from a sender (to a receiver) and used by the receiver to create an acknowledgement hash. The acknowledgement hash is then provided to the sender as evidence that the packets were successfully received. In some aspects, the acknowledgment hash is generated using a commutative operation (e.g., an XOR operation) based on the entropy information. As such, the acknowledgement hash can be generated by a receiver, irrespective of an order in which the packets are received. In some implementations, an acknowledgement hash may be small relative to hashes generated by conventional hashing functions. For example, the acknowledgement hash may be as small as a few bits, or a single byte (8 bits).

One or more acknowledgement hashes may be used to authenticate the validity of a sender-receiver connection or channel. For example, the receiver can be configured to periodically provide the sender with acknowledgement hashes generated based on entropy information for previously received data packets. By continuously (or periodically)

checking for valid acknowledgement hashes, the sender can be provided with probabilistic proof that an ongoing connection with the receiver is valid. In some implementations, the receiver may include a specification of which packets were represented in a hash. For example, a receiver may specify that a hash incorporates accumulated entropy information for all packets less than the Nth packet in a series of N (or more) transmitted packets. As a second example, a receiver may specify that a hash incorporates accumulated entropy information for all packets less than the Nth packet, but excluding a list of K packets $P_1, \ldots P_K$ (where K<N).

Figure 1A:
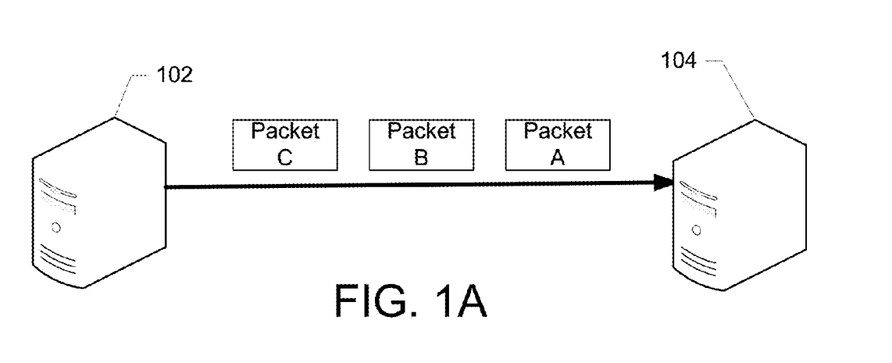
FIGS. 1A and 1B illustrate an example system for verifying receipt of data packets, according to some aspects of the subject technology.
Figure 1B:
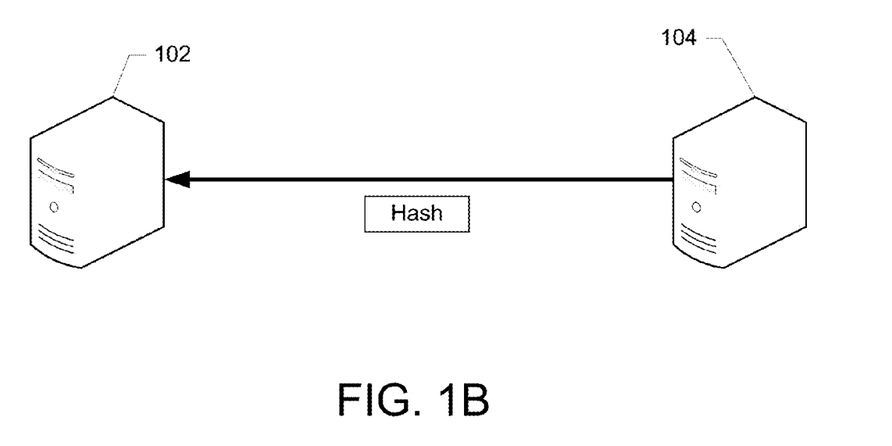

A simplified block diagram of a sender/receiver connection that can be used to implement aspects of the subject technology is shown in FIGS. 1A and 1B. Specifically, FIGS. 1A and 1B illustrate an example system 100 that provides communication between sender 102 and receiver 104. Although sender 102 and receiver 104 can be configured for direct communication, in certain implementations sender/receiver communication is facilitated by a communication network, such as the Internet. Additionally, aspects of the subject technology may be implemented wherein two or more processor-based devices (e.g., sender 102 and receiver 104) are configured to communicate with one another, irrespective of the communication protocol and/or communication network used to facilitate the transmission/reception of data packets.

As illustrated in FIG. 1A, sender 102 transmits multiple packets (e.g., packet A, packet B and packet C) to receiver 104. Each of packet A, packet B and packet C can contain information that uniquely identifies the associated packet and, as such, can be used to validate the receipt of packets (e.g., packet A, packet B and packet C) by receiver 104. As used herein, such information is referred to as "entropy information" which may be represented by "entropy bits." Entropy information (e.g., entropy bits) can be included in each packet that is emitted by sender 102.

In certain implementations, less than a single bit of entropy information may be used for multiple packets that are emitted by sender 102. By way of example, 1 bit random bit may be included in one of every three packets emitted by sender 102. As such, the average amount of entropy information included in each packet could be approximately ⅓rd of a bit.

Upon receiving one or more of the packets (e.g., packet A, packet B and/or packet C), receiver 104 can use the corresponding entropy information to provide a secure acknowledgement to sender 102, for example, to indicate that the packets were successfully received. Although the type of acknowledgement provided by receiver 104 can vary with implementation, in certain aspects, receiver 104 can use entropy information from one or more packets transmitted by sender 102 to generate an acknowledgement hash (e.g., a "hash") that is returned to sender 102.

Subsequently, sender 102 can use the hash to verify that each of the packets (e.g., packet A, packet B and packet C) was successfully received by receiver 104. By way of example, sender 102 can validate the hash against entropy information known by sender 102 to be associated with the transmitted packets. By validating the hash based on the entropy information, the delivery of the transmitted packets can be verified by sender 102. In some instances, the ability of sender 102 to verify the delivery of transmitted packets can mitigate the ability of malicious receivers to provide false acknowledgements, which can be used to instigate denial of service (DoS) attacks.

By way of example, a malicious receiver may send false reporting information to a sender (e.g., using ACK packets to indicate acknowledgement/receipt of data not intended for the malicious receiver). Using conventional communication protocols (such as TCP), the receipt of false or "spoofed" ACK packets may cause the sender to emit data at an increasing rate, potentially causing buffer overflows in one or more devices (e.g., "middle boxes") along the communication path. By implementing aspects of the subject technology, reporting information can be validated by the sender (e.g., by authenticating/validating a hash received from the purported receiver). This layer of authentication can prevent denial of service attacks that would have resulted in a conventional sender/receiver TCP connection.

In certain aspects, a transmit rate of sender 102 can be adjusted based on the entropy information reflected in a hash received from receiver 104. For example, one or more packets may be dropped during transmission from sender 102 to receiver 104, as such, the hash generated and returned by receiver 104 may only provide validation for a subset of the total packets transmitted. In such instances, sender 102 can adjust (e.g., lower) it's transmit rate, for example, because packet loss has occurred at a current transmit rate of sender 102. Alternatively, the transmit rate of sender 102 may be adjusted (e.g., increased) based on the receipt of a hash verifying that all transmitted packets have been received by receiver 104.

Figure 2:
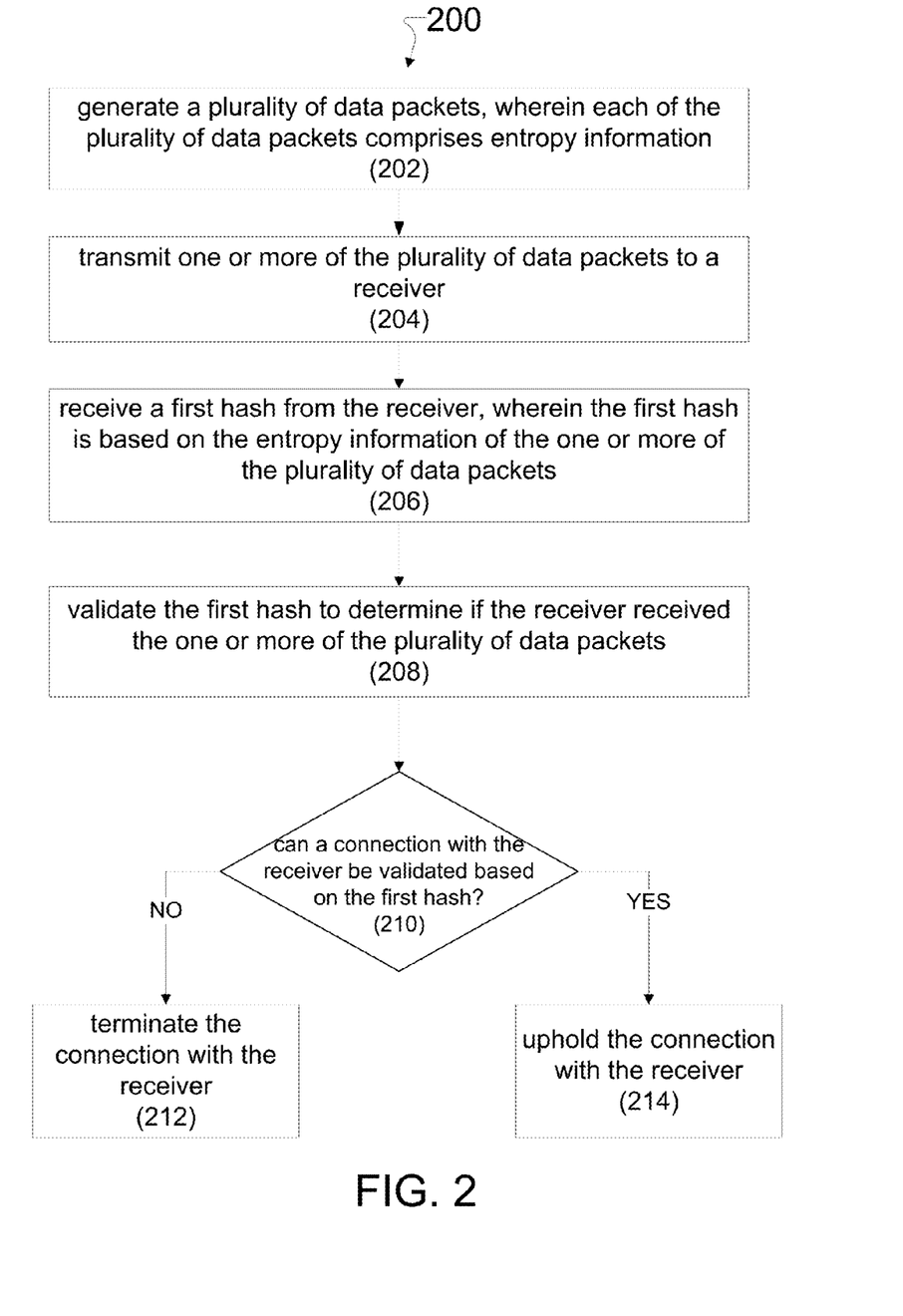
FIG. 2 illustrates a flow diagram of an example process for verifying receipt of data packets, according to some aspects of the subject technology.

An example process for validating a hash to determine if a receiver has received one or more transmitted packets is illustrated with respect to FIG. 2. Specifically, FIG. 2 illustrates steps of a process 200, which begins with step 202, in which a plurality of data packets are generated, and wherein each of the plurality of data packets comprises entropy information. As discussed above, each packet can include entropy information in the form of one or more entropy bits, and in some instances the entropy information for a packet may include less than one entropy bit.

Entropy information for a particular packet can comprise any type of information included in, or associated with, one or more packets. For example, entropy information can include payload data of a packet. However, in some implementations, payload data may be easily predicted by a malicious receiver and may not be a good choice of entropy information. As such, in certain aspects, entropy information can include information/data that is difficult to predict, such as transmission times for one or more packets, which can be included in packets using certain communication protocols, such as QUIC. In some implementations, entropy information can include random data/values that are inserted into a packet, for example, a single random bit.

In step 204, one or more of the plurality of data packets is transmitted (for example by a sender) to a receiver. As discussed above, transmission of the plurality of packets can occur using a direct communication means wherein a sender communicates directly with a receiver. However, in some aspects, communication between a sender and a receiver will occur over a communication network, such as the Internet. When transmitted over a communication network, the plurality of data packets can be received and forwarded by any number of intermediary devices (e.g., routers, switches, servers, computers, etc.) along the communication path to the receiver. Additionally, each packet transmitted by the sender may travel along a different communication path (e.g., through different routers, switches, servers and/or computers, etc.) while en route to the receiver. As such, packets transmitted by the sender may arrive at the receiver, in a different order from which they were sent.

In step 206, a first hash is received (e.g., by a sender) from the receiver, wherein the first hash is based on the entropy information of the one or more of the plurality of packets. As discussed above, the first hash may be generated based on a calculation or operation performed by the receiver using at least a portion of the entropy information. In some implementations, the first hash can be based on relatively small amounts of entropy information, for example as few as 1 (or fewer) bits of information per packet.

The first hash can be generated using different calculations or operations, depending on implementation; however, in certain aspects, the first hash is generated such that the order of hashing is not significant. For example, hashing can be performed using a commutative operation, such as, an arithmetic sum of entropy bits, an arithmetic sum modulo a constant (e.g., modulo 256), or a sum of circularly shifted copies of entropy bits where a shift amount is based on a packet sequence number for a corresponding packet. In another example, commutative hashing may be performed using an exclusive-or (XOR) operation. By using a commutative operation to generate the first hash, the generation of the first hash can occur independently of an order in which the data packets are received.

By way of example, packets may be received by the receiver in an order different from that in which they were originally transmitted, for example, because each of the packets was differently routed through the Internet. However, by generating the first hash using a commutative operation, the first hash resulting from the entropy information of the received packets is the same as that which would have been produced had the packets been received in a different order, for example, the order in which they were transmitted by the sender. Thus, the sender does not need to know the order in which the transmitted packets were received in order to validate the resulting hash.

In step 208, the first hash is validated to determine if the receiver received the one or more of the plurality of data packets. Although validation of the first hash (e.g., by a sender) may be performed differently depending on implementation, in certain aspects, the first hash will be compared to a result produced by the sender using the same entropy information. For example, the receiver may be configured to generate the first hash based on the available entropy information, using a predetermined algorithm. Once generated, the first hash may not be capable of being directly decoded. As such, the sender can validate the first hash by comparing it to a result (e.g., a comparison hash) that is generated using the same entropy information and the same (or a similar) algorithm as that used by the receiver. If the comparison hash produced by the sender matches the first hash produced by the receiver, the sender can determine that the entropy information was successfully received by the receiver.

In certain aspects, an acknowledgement (e.g., a first hash) may be received for which data or packets have not been sent. As such, the received acknowledgement/first hash will not be validated. In another example, an acknowledgement/first hash may be received that does not correspond with entropy information that has been transmitted by the sender and will not be validated.

In some implementations, the first hash can be used to evaluate a connection with a receiver. For example, in step 210 it is determined whether a connection with the receiver can be validated based on the first hash. In certain aspects, the connection can be validated by evaluating the first hash against a comparison hash, as described above with respect to step 208. However, in some implementations, one or more hashes, in addition to the first hash, may be used to validate a connection between the sender and the receiver.

If the connection is not properly validated, process 200 can proceed to step 212 wherein the connection with the receiver is terminated. By way of example, using a TCP protocol, a connection termination can involve the sending of a RESET packet to the receiver. In other communication protocols, such as QUIC, the connection may be terminated or reset by sending a CONNECTION_CLOSE fragment to the receiver.

Alternatively, if it is determined in step 210 that the connection is valid, process 200 can proceed to step 214, wherein the connection with the receiver will be upheld.

In certain aspects, the proper authentication of an acknowledgement hash received from the receiver can cause the adjustment of transmission rates and/or volume by the sender/transmitter. For example, a constraining congestion window can be made to grow/increase in response to the receipt of a valid acknowledgement hash, such as a valid first hash and a valid second hash. In some aspects, a congestion window of the sender may be increased at a rate faster than the increase that would occur for a TCP congestion window. For example, using a communication protocol such as QUIC, a congestion window may be increased by more than a factor of 4 each time a window is received without packet loss, as verified by the receipt of one or more valid acknowledgement hashes. As such, pacing of the sender may be configured to track available bandwidth, and may be less limited than growth that would be provided under a TCP protocol implementation (e.g., using a growth factor of 2).

After a sender-receiver connection has proved capable of handling a large bandwidth (e.g., with a specific amount of packet loss, such as may be indicated by one or more acknowledgement hashes), a sender can provide an attestation to a receiver about the channel's capability. For instance, a sender may provide an encrypted (or unencrypted) message authentication code (MAC) authenticated statement that a receiver has recently received data with an N packet congestion window (where N is a positive integer value). As a second example, a sender may provide an encrypted (or unencrypted) MAC authenticated statement that a receiver has recently received data with a data rate of B bytes per second, or P packets per second. The attestation can include a time stamp and/or one or more of connection parameters, such as a source IP address and/or destination IP address. In some implementations, a receiver may provide previous attestations of a channel's capacity to the sender, which can allow the sender to use the previous attestations as a starting point for channel capacity limits (rather than requiring another form of proof, such as via an acknowledgement hash). As a result, the transmit rate of the sender may be more quickly adjusted to comport with the capabilities of the sender-receiver channel.

In another aspect, a sender/transmitter can send an acknowledgement hash to the receiver, for example, to provide a bounded summary of packets, such as up to (and including) a specific packet sequence number, that have been transmitted to the receiver. The summary provided by the acknowledgement hash can be generated at the sender using an algorithm agreed upon by the sender, such as the currently agreed upon entropy hash calculation algorithm. The transmitter can include information for packets/data dropped in transmission and thus never received by the receiver. As such, the receiver may use the acknowledgement hash obtained from the sender as a baseline. The baseline can enable the receiver to only list the more recently missing packets, in the company of a larger accumulated hash of all packets. Such an accumulated hash can avoid the need to describe the list of previously unreceived packets (e.g., pre-baseline packets). In that example, without a sender-supplied baseline, a receiver would have to list a hash, and a detailed list of all unincorporated (e.g., unreceived) packets, in order for a hash to be validated by the sender.

Figure 3:
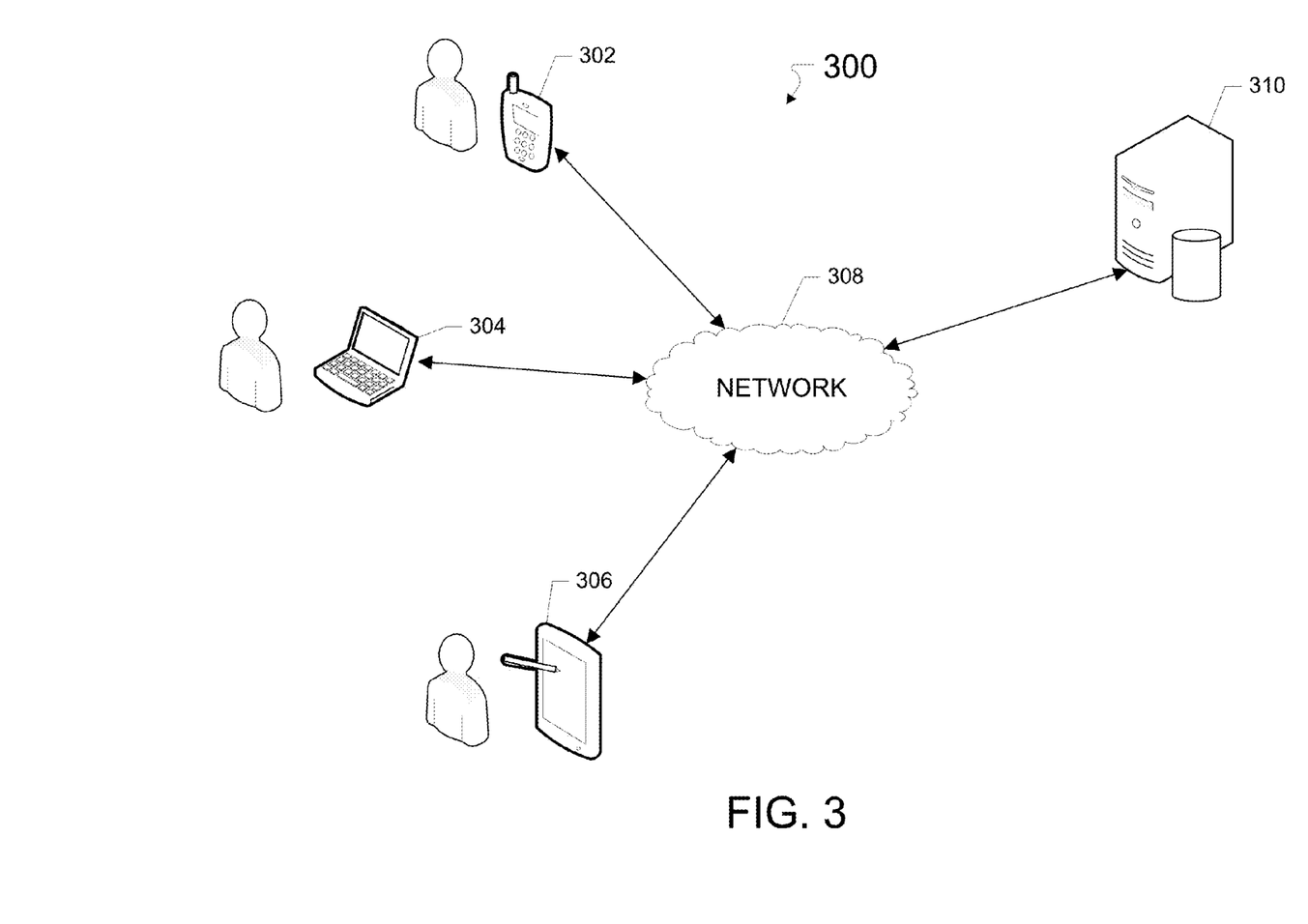
FIG. 3 illustrates an example network system that can be used to implement certain aspects of the subject technology.

FIG. 3 conceptually illustrates an example network system for implementing some aspects of the subject disclosure. Specifically, network system 300 comprises first user device 302, second user device 304, third user device 306, network 308 and server 310. As illustrated, first user device 302, second user device 304, third user device 306 and server 310 are communicatively connected via the network 308. It is understood that in addition to first user device 302, second user device 304, third user device 306 and server 310, any number of other processor-based devices could be communicatively connected to the network 308. Furthermore, as will be discussed in greater detail below, network 308 could comprise multiple networks, such as a network of networks, e.g., the Internet.

In some examples, one or more of the process steps of the subject technology can be implemented by one or more of first user device 302, second user device 304, third user device 306 and/or server 310, over network 308. By way of example, first user device 302 may be a "sender" or "transmitter" and server 310 may be a "receiver" or "recipient" according to the aspects discussed above. As such, first user device can be configured to transmit a plurality of packets, including entropy information, to server 310 and/or to any of the other user devices. Similarly, server 310 can be configured to generate a hash using the entropy information, and to send the hash to first user device 302 for validation.

Figure 4:
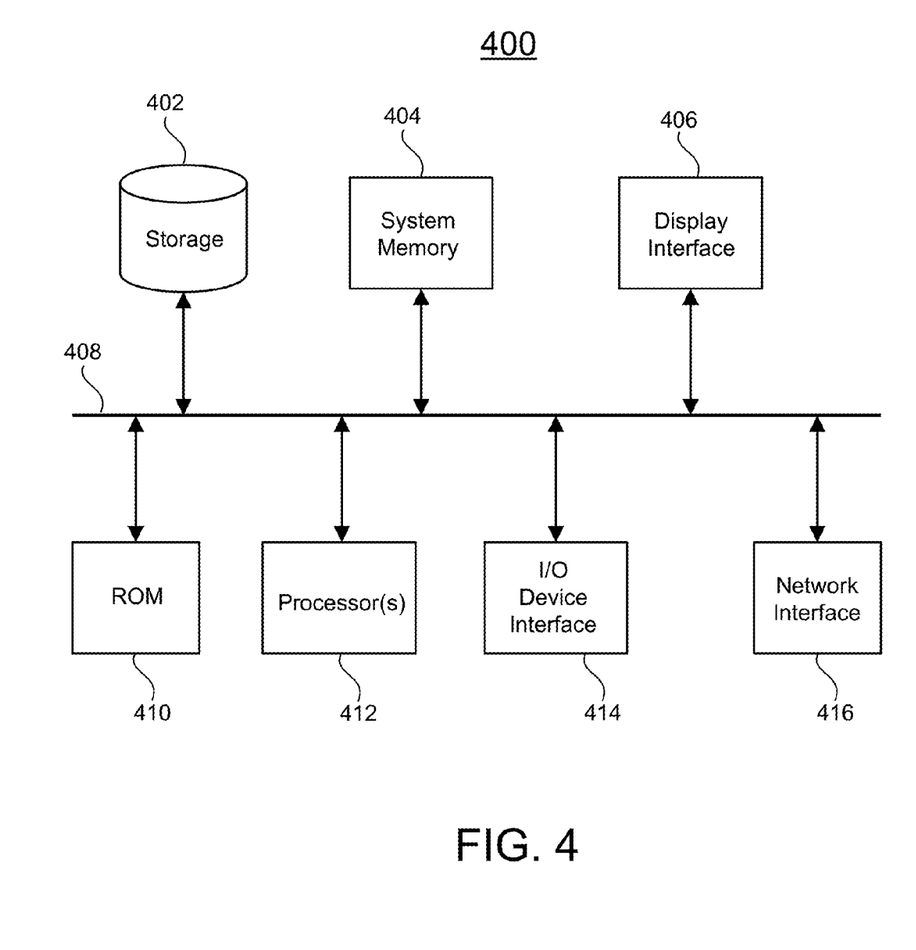
FIG. 4 illustrates an example of an electronic system with which some aspects of the subject technology can be implemented.

FIG. 4 illustrates an example of an electronic system 400 that can be used for executing the steps of the subject disclosure. In some examples, electronic system 400 can be a single computing device such as a user device, such as, first user device 302, second user device 304 or third user device 306, discussed above. Additionally, electronic system 400 may be a server, such as, server 310, discussed above. In some implementations, electronic system 400 can be operated alone or together with one or more other processor based systems e.g., as part of a cluster or a network of computers.

As illustrated, electronic system 400 includes storage 402, system memory 404, display interface 406, system bus 408, ROM 410, processor(s) 412, input/output interface 414 and network interface 416. In some aspects, system bus 408 collectively represents all system, peripheral, and chipset buses that communicatively connect the numerous internal devices of electronic system 400. For instance, system bus 408 communicatively connects processor(s) 412 with ROM 410, system memory 404, display interface 406 and storage 402.

In some implementations, processor(s) 412 retrieve instructions to execute (and data to process) in order to execute the steps of the subject technology. Processor(s) 412 can be a single processor or a multi-core processor in different implementations. Additionally, processor(s) 412 can comprise one or more graphics processing units (GPUs) and/or one or more decoders, depending on implementation.

ROM 410 stores static data and instructions that are needed by processor(s) 412 and other modules of electronic system 400. Similarly, processor(s) 412 can comprise one or more memory locations such as a CPU cache or processor in memory (PIM), etc. Storage device 402, can be a read-and-write memory device. In some aspects, this device can be a non-volatile memory unit that stores instructions and data even when electronic system 400 is without power. Some implementations of the subject disclosure can use a mass-storage device (such as solid state, magnetic or optical storage devices) e.g., storage 402.

Other implementations can use one or more a removable storage devices (e.g., magnetic or solid state drives) such as storage 402. Although system memory 404 can be either volatile or non-volatile, in some examples system memory 404 is a volatile read-and-write memory, such as a random access memory. System memory 404 can store some of the instructions and data that processor(s) 412 need at runtime.

The processes of the subject disclosure can be stored in system memory 404, permanent storage device 402, ROM 410 and/or one or more memory locations embedded with processor(s) 412. From these various memory units, processor(s) 412 retrieve instructions to execute and data to process in order to execute the processes of some implementations of the instant disclosure.

By way of example, processor(s) 412 can be configured to execute instructions in order to perform steps for generating a plurality of data packets, wherein each of the plurality of data packets comprises entropy information, transmitting one or more of the plurality of data packets to a receiver, and receiving a first hash from the receiver, wherein the first hash is based on the entropy information of the one or more of the plurality of data packets. In certain aspects, processor(s) 412 can be further configured to perform steps for validating the first hash to determine if the receiver received the one or more of the plurality of data packets and adjusting a rate at which data is transmitted to the receiver, in response to a determination that the receiver has received the one or more of the plurality of data packets. In further implementations, processor(s) 412 can also perform steps for decreasing a rate at which data is transmitted to the receiver, if it is determined that the receiver did not receive the one or more of the plurality of data packets.

Bus 408 also connects to input device interface 414 and display interface 406. Input device interface 414 enables a user to communicate information and select commands to electronic system 400. Input devices used with input device interface 414 may include for example, alphanumeric keyboards and pointing devices (also called "cursor control devices") and/or wireless devices such as wireless keyboards, wireless pointing devices, etc.

Finally, as shown in FIG. 4, bus 408 also communicatively couples electronic system 400 to a network (not shown) through network interface 416. It should be understood that network interface 416 can be either wired, optical or wireless and may comprise one or more antennas and transceivers. In this manner, electronic system 400 can be a part of a network of computers, such as a local area network ("LAN"), a wide area network ("WAN"), or a network of networks, such as the Internet (e.g., network 308, as discussed above).

In practice the methods of the subject technology can be carried out by electronic system 400. In some aspects, instructions for performing one or more processes of the present disclosure are stored on one or more memory devices such as storage 402 and/or system memory 404.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method for verifying receipt of data packets, comprising:
   generating a plurality of data packets, wherein each of the plurality of data packets comprises entropy information;
   transmitting a first generated data packet to a receiver;
   receiving a first hash from the receiver, wherein the first hash is based on first entropy information of the first generated data packet;
   validating the first hash to determine if the receiver received the first generated data packet;
   transmitting a second generated data packet to the receiver;
   receiving a second hash from the receiver, wherein the second hash is based on second entropy information associated with the second generated data packet;
   validating the second hash to determine if the receiver received the second generated data packet; and
   authenticating a connection with the receiver based on the validated first hash and the validated second hash.

2. The method of claim 1, wherein the first hash is based on a commutative calculation which is performed using at least part of the entropy information of the one or more of the plurality of data packets, wherein the first hash incorporates accumulated entropy information for all packets less than the Nth packet in a series of at least N transmitted packets.

3. The method of claim 2, wherein the commutative calculation comprises an XOR calculation.

4. The method of claim 1, further comprising:
   adjusting a rate at which data is transmitted to the receiver, in response to a determination that the receiver has received the one or more of the plurality of data packets.

5. The method of claim 1, further comprising:
decreasing a rate at which data is transmitted to the receiver, if it is determined that the receiver did not receive the one or more of the plurality of data packets.

6. The method of claim 1, further comprising:
authenticating a connection with the receiver based on the first hash; and
terminating the connection with the receiver if the first hash is not properly validated.

7. The method of claim 1, further comprising:
authenticating a connection with the receiver based on the first hash; and
upholding the connection with the receiver if the first hash is properly validated.

8. The method of claim 1, wherein one of the first and second entropy information comprises transmission times for one or more packets.

9. The method of claim 1, wherein one of the first and second entropy information comprises a single random bit inserted into one or more, but fewer than all, of the plurality of data packets, wherein the average amount of entropy information included in each of the plurality of data packets is less than one bit.

10. A system for verifying receipt of data packets, the system comprising:
one or more processors; and
a non-transitory computer-readable medium comprising instructions stored therein, which when executed by the processors, cause the processors to perform operations comprising:
generating a plurality of data packets, wherein each of the plurality of data packets comprises entropy information;
transmitting a first generated data packet to a receiver;
receiving a first hash from the receiver, wherein the first hash is based on a commutative calculation performed using at least a part of first entropy information of the first generated data packet;
validating the first hash to determine if the receiver received the first generated data packet;
transmitting a second generated data packet to the receiver;
receiving a second hash from the receiver, wherein the second hash is based on second entropy information associated with the second generated data packet;
validating the second hash to determine if the receiver received the second generated data packet; and
authenticating a connection with the receiver based on the validated first hash and the validated second hash.

11. The system of claim 10, wherein the commutative calculation comprises an XOR calculation.

12. The system of claim 10, wherein the processors are further configured to perform operations for:
adjusting a rate at which data is transmitted to the receiver, in response to a determination that the receiver has received the one or more of the plurality of data packets.

13. The system of claim 10, wherein the processors are further configured to perform operations for:
decreasing a rate at which data is transmitted to the receiver, if it is determined that the receiver did not receive the one or more of the plurality of data packets.

14. The system of claim 10, wherein the processors are further configured to perform operations for:
authenticating a connection with the receiver based on the first hash; and
terminating the connection with the receiver if the first hash is not properly validated.

15. The system of claim 10, wherein the processors are further configured to perform operations for:
authenticating a connection with the receiver based on the first hash; and
upholding the connection with the receiver if the first hash is properly validated.

16. A non-transitory computer-readable storage medium comprising instructions stored therein, which when executed by a processor, cause the processor to perform operations comprising:
generating a plurality of data packets, wherein each of the plurality of data packets comprises entropy information;
transmitting a first generated data packet to a receiver;
receiving a first hash from the receiver, wherein the first hash is based on first entropy information of the first generated data packet;
validating the first hash to determine if the receiver received the first generated data packet;
transmitting a second generated data packet to the receiver;
receiving a second hash from the receiver, wherein the second hash is based on second entropy information associated with the second generated data packet;
validating the second hash to determine if the receiver received the second generated data packet; and
authenticating a connection with the receiver based on the validated first hash and the validated second hash.

17. The non-transitory computer-readable storage medium of claim 16, wherein the first hash is based on a commutative calculation which is performed using at least part of the entropy information of the one or more of the plurality of data packets, wherein the first hash incorporates accumulated entropy information for all packets less than the Nth packet in a series of at least N transmitted packets, but excluding a list of K packets where K<N.

18. The non-transitory computer-readable storage medium of claim 17, wherein the commutative calculation comprises an XOR calculation.

19. The non-transitory computer-readable storage medium of claim 16, further comprising:
adjusting a rate at which data is transmitted to the receiver, in response to a determination that the receiver has received the one or more of the plurality of data packets.

20. The non-transitory computer-readable storage medium of claim 16, further comprising:
decreasing a rate at which data is transmitted to the receiver, if it is determined that the receiver did not receive the one or more of the plurality of data packets.

* * * * *